United States Patent [19]
Halliday et al.

[11] Patent Number: 6,165,945
[45] Date of Patent: Dec. 26, 2000

[54] BLENDS OF GLYCOL DERIVATIVES AS GAS HYDRATE INHIBITORS IN WATER BASE DRILLING, DRILL-IN, AND COMPLETION FLUIDS

[75] Inventors: William S. Halliday, Cypress; Dennis K. Clapper, Houston; Mark R. Smalling, Spring; Ronald G. Bland, Houston, all of Tex.

[73] Assignee: Baker Hughes Incorporated, Houston, Tex.

[21] Appl. No.: 09/009,554

[22] Filed: Jan. 20, 1998

[51] Int. Cl.$^7$ .................................................. C09K 7/02
[52] U.S. Cl. ........................ 507/139; 507/136; 507/261; 507/266; 507/925
[58] Field of Search .................... 507/136, 139, 507/261, 266, 925; 585/15

[56] References Cited

U.S. PATENT DOCUMENTS

| | | | |
|---|---|---|---|
| 2,690,814 | 10/1954 | Reid | 585/15 |
| 5,076,364 | 12/1991 | Hale et al. | 507/139 |
| 5,635,458 | 6/1997 | Lee et al. | 507/136 |
| 5,723,524 | 3/1998 | Cohen et al. | 585/15 |

FOREIGN PATENT DOCUMENTS

| | | |
|---|---|---|
| WO 94/24413 | 10/1994 | WIPO . |
| WO 96/04348 | 2/1996 | WIPO . |
| WO 96/22451 | 7/1996 | WIPO . |

*Primary Examiner*—Philip Tucker
*Attorney, Agent, or Firm*—Paula D. Morris & Associates, P.C.

[57] ABSTRACT

A drilling, drill-in, or completion fluid comprising water as a continuous phase, said continuous phase comprising a gas hydrate inhibiting amount of a blend comprising an ethylene glycol derivative and a propylene glycol derivative. The propylene glycol derivative is present in an amount effective to inhibit hydration of shale by the water base. The density of the fluid may be reduced by substituting the blend for salt, and by increasing the amount of propylene glycol derivative in the blend. The blend preferably should comprise at least about 10 vol % of the fluid, and a preferred ratio in the blend is about 35 vol % tripropylene glycol bottoms to about 65 vol % ethylene glycol.

7 Claims, No Drawings

BLENDS OF GLYCOL DERIVATIVES AS GAS HYDRATE INHIBITORS IN WATER BASE DRILLING, DRILL-IN, AND COMPLETION FLUIDS

FIELD OF THE INVENTION

The present invention relates to methods and compositions for suppressing gas hydrate formation and shale hydration using water-base drilling, drill-in, and completion fluids.

BACKGROUND OF THE INVENTION

The petroleum industry continues to expand deepwater exploration and drilling efforts in many areas of the world. As drilling water depth increases, the potential for natural gas hydrate formation during drilling operations also increases.

Gas hydrates are solid, ice-like crystals that form under elevated pressures and at moderately low temperatures. Gas hydrates consist of water molecules which form five (pentagon) and six (hexagon) membered polygonal structures which combine to form closed structures (often called a "cage"). These "cages" totally enclose or trap a gas molecule. At high pressures, multiple "cages" tend to combine to form larger cages enclosing gas molecules. The resulting large crystalline assemblies are thermodynamically favored at elevated pressures. Under sufficient pressure, gas hydrates will form at temperatures well above the freezing point of water.

Primary promoters of gas hydrates are gas with "free" water present at or below its water dew point, low temperatures, and high pressures. Secondary promoters are high velocities, pressure pulsations, any type of agitation, and the introduction of a small crystal of a hydrate. During deepwater drilling operations, all of the primary gas hydrate promoters are present.

The formation of gas hydrates in deepwater drilling operations creates safety concerns and can prevent proper operation of the blowout preventer during well-control operations, causing costly delays in controlling the wells. The use of a 20% sodium chloride/PHPA drilling mud system suppresses gas hydrate formation by 13.3–15.6° C. (24–28° F.) below that of freshwater. Often, however, it is necessary to suppress the temperature of hydrate formation even further—for example, during disconnects. "Spotting" of certain materials reportedly is effective to temporarily remove hydrates from various equipment and/or lines; however, spotting often is not performed until after gas hydrates have formed and caused the very delays sought to be avoided.

Another problem that occurs during deep water drilling is that "water-sensitive shales"—or formations having clay minerals as major constituents, such as shales, mudstones, siltstones, and claystones—often must be penetrated before reaching the hydrocarbon bearing zone. Various problems are encountered when drilling through water-sensitive shales, particularly using water-base drilling fluids. Water adsorption and hydration of the shale typically results in stress and/or volume increases, and can induce brittle or tensile failure of the formation. Such failures lead to sloughing, cave in, and stuck pipe. The volume increases also reduce the mechanical strength of the shales, and cause swelling of the wellbore, disintegration of cuttings in drilling fluid, and balling up of drilling tools.

Low density drilling fluids are needed which inherently will provide hydrate suppression under deep water drilling conditions, which will decrease water adsorption and hydration of water-sensitive shales, and which still have desirable rheology and fluid loss control properties for deepwater environments.

SUMMARY OF THE INVENTION

The present invention provides a fluid comprising water as a continuous phase and being selected from the group consisting of a drilling, a drill-in, and a completion fluid, the continuous phase comprising a gas hydrate inhibiting amount of a blend comprising a first amount of an ethylene glycol derivative at a ratio to a second amount of a propylene glycol derivative, wherein said ratio is effective to inhibit hydration of shale by said water base.

DETAILED DESCRIPTION OF THE INVENTION

Gas hydrate suppression is needed for several types of fluids used during drilling operations. Drilling operations typically involve mounting a drill bit on the lower end of a drill pipe or "drill stem" and rotating the drill bit against the bottom of a hole to penetrate a formation, creating a borehole. A drilling mud may be circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole.

A drilling fluid with a relatively high viscosity at high shear rates can place undesirable mechanical constraints on the drilling equipment and may even damage the reservoir. Higher viscosity fluids also exert higher pressures outward on the borehole, which may cause mechanical damage to the formation and reduce the ability of the well to produce oil or gas. Higher viscosity fluids also may fracture the formation, requiring a drilling shut down in order to seal the fracture. In deepwater environments, drilling muds must clean large, often deviated well bores, stabilize tectonically weak formations, inhibit mud making shales, and gain environmental acceptance.

A different fluid, known as a "drill-in" fluid, is pumped through the drill pipe while drilling through the "payzone," or the producing zone. A "completion fluid" is pumped down a well after drilling operations are complete, during the "completion phase," to remove drilling mud from the well and to support the well while the equipment required to produce fluids to the surface is installed in the well. Each of these fluids needs a component that will suppress hydrate formation without adversely affecting the rheological and fluid loss control properties of the fluid.

A desirable characteristic of a drilling fluid in most applications is high density combined with an ability to flow easily at high velocities. In rheological terms, the drilling fluid typically should have a density of between about 0.9–2.5 g/cm$^3$, and a relatively low plastic viscosity, preferably less than about 50, more preferably less than about 40, and most preferably less than about 30. Another desirable rheological property is yield point, which should be at least about 24.4 kg/100 m$^2$ (5 lb/100 ft$^2$), preferably from about 24.4 to 146.4 kg/100 m$^2$ (5 to 30 lb/100 ft$^2$).

In certain applications, relatively low density fluids are required in order to avoid fracturing the formation. A primary low density application is deep water drilling. As used herein, the term "deepwater drilling" is defined to mean drilling at water depths of greater than about 304.8 meters (1000 feet). The fluids used during deep water drilling preferably should have a density which is less than the fracture gradient of the formation being drilled through.

The present invention provides drilling fluids which incorporate as integral components hydrate inhibiting blends which are non-toxic, economical, and effective to inhibit hydrate formation during drilling, drill-in, and completion operations without adversely affecting the rheological and/or fluid loss control properties of the fluid. The hydrate suppressors suppress hydrates in a pressure and temperature range between about 3.45 MPa (500 psia) at 1.67° C. (35° F.) or lower to about 55.15 MPa (8000 psia) at 26.67° C. (80° F.) or lower, particularly between about 6.895 MPa (1000 psia) at 1.67° C. (35° F.) or lower to about 41.37 NPa (6000 psia) at 26.67° C. (80° F.) or lower.

The hydrate suppressors of the present invention are blends comprising two components—an "ethylene glycol derivative" and a "propylene glycol derivative." In a preferred embodiment, the blend comprises at least about 10 vol % propylene glycol derivative, more preferably at least about 20 vol % propylene glycol derivative, and most preferably about 30 vol % propylene glycol derivative. The blend may comprise up to about 50 vol % propylene glycol derivative or more.

Suitable ethylene glycol derivatives include, but are not necessarily limited to ethylene glycol, polyethylene glycols, and ethylene glycol ethers having a total molecular weight of up to about 2000. A preferred ethylene glycol derivative is ethylene glycol. Suitable propylene glycol derivatives include, but are not necessarily limited to propylene glycol, polypropylene glycols, and polypropylene glycol ethers having a total molecular weight of up to about 2000, preferably those having a total molecular weight of up to about 1000. A preferred propylene glycol derivative is tripropylene glycol bottoms (TPGB) obtained from Dow USA. TPGB comprises 5–20 wt % tripropylene glycol (CAS # 001638-16-0) with a balance of polypropylene glycol highers (CAS #025322-69-4). Dow USA TPGB has the following physical properties:

| | |
|---|---|
| Boiling point: | 268° C. (515° F.) |
| Vapor pressure: | <0.01 mm Hg @ 20° C. |
| Vapor density: | >1 |
| Solubility in water: | Miscible |
| Specific Gravity: | 1.023 |
| Appearance: | Dark brown, viscous liquid |
| Odor: | Slight characteristic odor. |
| Flash point: | >140° C. (285° F.) |

The specific gravity of TPGB—under 1.05—is significantly lower than the specific gravity of ethylene glycol at 1.115.

The blends of the present invention not only provide gas hydrate inhibition, the blends also provide improved shale inhibition compared to the use of ethylene glycol, alone, as a gas hydrate inhibitor. The blends also can be formulated at lower densities than fluids which use salts for hydrate suppression, and thus can reduce the risk of fracturing the formation during deep water drilling.

Without limiting the present invention to any particular theory or mechanism of action, the organic molecules in the blend are believed to inhibit hydrate formation by associating with the water molecules in the fluid and to interfere with either the availability of the water molecules or the ability of the water molecules to form polygonal water "cages." The result is that the temperature at which hydrates form is suppressed. The organic molecules in the blend also are believed to act as a semi-permeable barrier that separates the water molecules in the fluid from the shales, thus preventing water adsorption and hydration of the shale.

The blend of the present invention not only suppresses hydrate formation and water adsorption and hydration of water-sensitive shales, but also improves the overall performance of the water base drilling fluid by reducing the density of the fluid when compared to state of the art fluids which exhibit comparable hydrate suppression. A preferred ethylene glycol and TPGB blend has been found to meet the current EPA requirements for discharge into U.S. waters.

As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. The mysid shrimp toxicity test for a preferred ethylene glycol/TPGB blend (65 wt %/35 wt %, respectively) resulted in an $LC_{50}$ of 200,000 ppm of the suspended particulate phase (SPP)—over 6 times the minimum EPA standard for discharge into coastal waters. The blend has the added advantage that it produces no sheen on the receiving waters.

Substantially any water based drilling, drill-in, or completion fluid may be treated according to the present invention. An example formulation of one barrel of a preferred low density deepwater drilling fluid is shown in the following Table:

| Product | Concentration |
|---|---|
| Drillwater | 0.8 bbl |
| NEW DRILL PLUS | 0.75 ppb |
| NaCl | 23% by wt |
| MIL-PAC LV | 1 ppb |
| BIO-LOSE | 2.5 ppb |
| XCD Polymer | 0.75 ppb |
| 65/35 ethylene glycol/TPGB | 30% by wt |
| | Total = 1 bbl |

NEW DRILL PLUS, MIL-PAC, and BIO-LOSE are products which may be obtained from Baker Hughes INTEQ, Houston, Tex. XCD Polymer is available from Kelco Rotary, San Diego, Calif. TPGB is available from a number of suppliers, preferably Dow USA. The other listed materials are commodities which are commercially available from numerous sources well known to persons of ordinary skill in the art.

The fluid should contain at least about 5 vol % of the hydrate suppressing blend, preferably at least about 10 vol %, more preferably in the range of from about 10 to about 80 vol %, and most preferably in the range of from about 10 to about 30 vol % of the blend. The 23% NaCl fluid (containing 10% 65/35 blend of EG/TPGB) is the most inhibitive fluid in regard to gas hydrate inhibition with a hydrate suppression of approximately 23.34° C. (42° F.).

| Fluid Type | Hydrate Suppression ΔT (° C./° F.) | Density, g/cm³(lb/gal) |
|---|---|---|
| Fresh Water | 0 | 1 (8.33) |
| Sea Water | 2.22/4 | 1.02 (8.5) |
| 10% NaCl | 7.78/14 | 1.08 (9.0) |

| Fluid Type | Hydrate Suppression ΔT (° C./° F.) | Density, g/cm³(lb/gal) |
|---|---|---|
| 20% NaCl | 16.11/29 | 1.15 (9.6) |
| 23% NaCl | 17.22/33 | 1.17 (9.8) |
| 23% NaCl/ 10% 65/35 blend EG/TPGB | 23.34/42 | 1.15 (9.6) |

Persons of ordinary skill in the art will be able to use the blend to achieve a desired level of gas hydrate suppression at given conditions of temperature and pressure.

Because of their relatively low density, fluids containing a blend of ethylene glycol derivative and propylene glycol derivative should prove useful when encountering gradients having poor fracture integrity. The density of the fluid can be reduced by reducing the salt content of the fluid. In fact, it may be possible to eliminate the need for any salt to suppress hydrate formation, and to decrease water adsorption and hydration of water-sensitive shales. Even with a lowered salt content, the temperature of hydrate formation should be reduced by approximately 5° C. (9° F.) when the fluid contains at least about 10 vol % of the EG/TPGB blend.

The invention will be more clearly understood with reference to the following examples, which are illustrative only and should not be construed as limiting the invention.

EXAMPLE 1

Test wafers or pellets were prepared from a reactive Mississippi Canyon shale sample. XRD analysis indicated that the sample consisted of 40–45% mixed layers and had a greater than 80% expandable matrix. The CEC of the sample was 18 meq/100 g.

Wafers were weighed and measured before being placed and hot rolled in a sample of a fluid having the compositions outlined below. The samples of fluid containing the pellet or wafer were hot rolled for approximately 48 hours in an oven at approximately 65° C. (150° F.). After hot rolling, the wafers were recovered. The percent recovery, hydration (water uptake), volume change, and hardness were determined for each wafer. With the exception of hardness, which is expressed as a direct measurement by durometer, the changes in each parameter were calculated by comparison to the initial values. The fluid samples included HF-100N, a polyglycerine material currently available from Baker Hughes INTEQ for gas hydrate suppression, ethylene glycol, and the indicated blends of ethylene glycol and TPGB obtained from Baker Hughes INTEQ. The results indicate higher recovery, higher hardness, lower hydration, and lower volume change—in other words, improved shale inhibition characteristics—using the blend of ethylene glycol with TPGB. The results also indicate that fluids made using the ethylene glyco/TPGB blend had a lower density The deepwater fluid formulation used was:

| Drillwater | 0.8 bbls |
|---|---|
| Biolose | 2.5 ppb |
| Mil Pac IV | 1 ppb |
| New Drill Plus | 0.85 ppb |
| XCD Polymer | 0.75 ppb |
| NaCl | 23% by weight |

The eight test fluids contained:
1) 23% NaCl/PHPA*/30% HF 100 N;
2) 23% NaCl/PHPA/30% ethylene glycol;
3) 23% NaCl/PHPA/30% ethylene glycol/TPGB@90/10 blend;
4) 23% NaCl/PHPA/30% ethylene glycol/TPGB@80/20 blend;
5) 23% NaCl/PHPA/30% ethylene glycol/TPGB@65/35 blend;
6) 23% NaCl/PHPA/30% ethylene glycol/TPGB@65/35 blend;
7) 23% NaCl/PHPA/30% ethylene glycol/TPGB@60/40 blend;
8) 23% NaCl/PHPA/30% ethylene glycol/TPGB@50/50 blend.

*PHPA refers to partially hydrolyzed polyacrylamide.

The yield point of all of the test fluids was maintained at 15 lb/100 square feet with small additions of XCD polymer. The pH of the fluids also was maintained at 7.0.

Each fluid was prepared by shearing in a Silverson blender for 45 minutes. The fluids were dynamic-aged 4 hours at 65±0.5° C. (150±5° F.) and stirred again for 5 minutes by a Prince Castle mixer. The fluids were stabilized for 16 hours at 65± 0.5° C. (150±5° F.) and stirred again for 5 minutes on a Prince Castle mixer. The fluids containing shale wafers were then dynamically aged for 48 hours at 65±0.5° C. (150±5° F.) and the rheological properties (48.9° C./120° F., API, 100-psi differential) were measured.

The following were the properties of the test fluids after stabilizing:

| FLUID | #1 | #2 | #3 | #4 | #5 | #6 | #7 | #8 |
|---|---|---|---|---|---|---|---|---|
| Density, lb/gal | 10 | 9.7 | 9.68 | 9.66 | 9.65 | 9.64 | 9.63 | 9.62 |
| 600 Fann rpm | 42 | 51 | 46 | 44 | 42 | 41 | 40 | 40 |
| 300 Fann rpm | 27 | 34 | 32 | 30 | 28 | 28 | 27 | 26 |
| 200 Fann rpm | 20 | 22 | 21 | 20 | 21 | 21 | 20 | 19 |
| 100 Fann rpm | 13 | 14 | 12 | 12 | 13 | 13 | 13 | 12 |
| 06 Fann rpm | 3 | 3 | 3 | 3 | 3 | 3 | 3 | 3 |
| 03 Fann rpm | 2 | 2 | 2 | 2 | 2 | 2 | 2 | 2 |
| Pv (cp@ 48.9° C./ 120° F.) | 15 | 17 | 14 | 14 | 14 | 13 | 13 | 14 |
| YP kg/m² (lb/100 sq ft) | 58.6 (12) | 83 (17) | 87.8 (18) | 78.1 (16) | 68.3 (14) | 73.2 (15) | 68.3 (14) | 58.6 (12) |
| 10 sec gel kg/m² (lb/100 sq ft) | 14.6 (3) | 19.5 (4) | 19.5 (4) | 1.5 (4) | 14.6 (3) | 14.6 (3) | 14.6 (3) | 14.6 (3) |
| 10 min gel kg/m² (lb/100 sq ft) | 19.5 (4) | 24.4 (5) | 24.4 (5) | 24.4 (5) | 19.5 (4) | 19.5 (4) | 9.8 (2) | 9.8 (2) |
| API Filtrate (ml) | 7.6 | 6.8 | 6.8 | 6.4 | 6.0 | 5.8 | 5.8 | 5.4 |

The resulting rheological values show a very mild depletion in the top end Fann readings while improving API fluid loss values by providing a thinner more lubricious wallcake. The properties of the 65/35 blend #6 are very similar ot the fluid made using HF 100N (#1) except for the improvement in API fluid loss.

EXAMPLE 2

The fluids prepared in Example 1 were subjected to the shale wafer test, which measures the disintegration properties of a particular shale in contact with a drilling fluid or liquid composition over a measured time period. Shale disintegration was measured and recorded in four ways:

Weight recovery in weight percent
Shale hydration in weight percent

Change in shale wafer hardness (durometers)

Increase or decrease in shale wafer volume (percent change from original size)

Shale cuttings which were heavily contaminated with water base mud were washed using a fine spray of water from a wash bottle, taking care to minimize loss of fine colloidal material. A 180 micron sieve was used for washing in order to retrieve as much of the solids as possible. The activity of the shale cuttings was measured and recorded, and the cuttings were air dried for about 24 hours on a soft absorbent tissue under laboratory conditions. The shale cuttings were dried in an oven at a temperature not exceeding about 65° C.±3° C. (150° F.±5° F.) for about 4±1 hour.

The cuttings then were ground using a grinding mill to pass through a 180 micron screen. An amount of water was added based on an estimate of the connate water content. Each pressed wafer weighed about 20 g. Generally 8 to 15 percent by weight of water covered most of the interstitial water contents.

The appropriate amount of deionized water was added to a weighed amount of ground shale in a jar. The amount of water added was recorded. The jars were capped with a lid and shaken. To enhance the wetting process, the moist shale was placed in a blender and stirred for 15–30 seconds and worked to a homogenous semi-sticky paste. The mortar was scraped with a spatula to remove any adherent material. Samples comprising about 20±1 g of the semi-sticky shale were placed into stainless steel die, which were precoated with a light oil to aid in release of the wafer. A piston, which also was precoated with the light oil, and was inserted and the die was positioned onto the press plate holder. A pressure of 41.32 MPa +1.47 MPa (6000±200 psig) was applied for about 2±0.5 minutes. The pressure then was released and the wafer removed from the die. One of the wafers was weighed ($W_1$). The wafer then was dried in an oven at 104±30° C. (220±5° F.) to constant weight and the weight recorded ($W_2$). From the weight difference, the percent moisture content was calculated and applied to all wafers used in the series. The wafer used to determine this value was discarded.

Each wafer was weighed and calipered and the values recorded. Durometer tests were made in triplicate and the results recorded. Each jar was hot rolled for about 16 hours at about 65° C. (150° F.). The jars were removed from the oven and cooled, and the fluid was poured over a 40 micron sieve to retrieve the wafer from the fluid. The wafers were carefully dried with a soft absorbent tissue, and immediately weighed ($W_3$). The hardness (durometer) of the wafer was measured in triplicate. The wafers were calipered to obtain an average diameter and height, and then dried at 66–104° C. (150–220° F.) for about 16 hours and reweighed ($W_4$).

The following nomenclature was used in making calculations (weight being in g):

$W_1$=Weight of Pressed Wafer $W_2$=Weight of Pressed Wafer Dried to Constant Weight $W_3$=Weight of Wafer After Hot-Rolling 16 hr $W_4$=Weight of Wafer After Hot-Rolling 16 hr and drying to constant weight $V_1$=Volume of Pressed Wafer in $m^3$ $V_2$=Volume of Wafer After 16 hr Hot-Rolling in $m^3$ $P_1$=Average Durometer Dial Reading of Pressed Wafer $P_2$=Average Durometer Dial Reading of Wafer After 16 hr Hot-Rolling The following formulas were used to determine the parameters tabulated in the table below:

% Moisture in Pressed Shale Wafer (assuming all wafers in the test series had the same moisture):

$$\% \text{ Moisture} = 100 \times \frac{W_1 - W_2}{W_2}$$

$$\text{Shale Recovery, \% by weight} = 100 \times \frac{W_4}{W_2}$$

$$\text{Shale Hydration \% by weight} = 100 \times \frac{W_4\left(1 + \frac{\% \text{ moisture}}{100}\right)}{W_4\left(1 + \frac{\% \text{ moisture}}{100}\right)}$$

$$\text{Volume Change of Shale Wafer}, m = \frac{V_1 - V_2}{V_1}$$

$$\% \text{ Change in Hardness} = 100 \times \frac{P_1 - P_2}{P_1}$$

The following table tabulates the results of the shale inhibition testing:

| PARAMETER | #1 | #2 | #3 | #4 | #5 | #6 | #7 | #8 |
|---|---|---|---|---|---|---|---|---|
| Percent Moisture | 10 | 10 | 10 | 10 | 10 | 10 | 10 | 10 |
| Initial Wt, g | 18.8 | 18.8 | 19.6 | 19.4 | 19.3 | 19.4 | 19.3 | 18.8 |
| Final Wt, g | 14.6 | 12.8 | 13.6 | 14.2 | 14.8 | 17.2 | 16.6 | 16.4 |
| Wet Wt, g | 17.8 | 16.6 | 17.2 | 17.6 | 18.2 | 19 | 18.8 | 18.2 |
| Hydration % | 10.8 | 17.9 | 15.0 | 12.7 | 11.8 | 0.4 | 3.0 | 0.9 |
| % Recovery | 86.3 | 75.7 | 77.1 | 81.3 | 85.2 | 98.5 | 95.6 | 96.9 |
| % Volume Change | 4.0 | 17.3 | 14.2 | 12.0 | 8.8 | 5.3 | 6.6 | 8.8 |
| Hardness | 90 | 74 | 78 | 85 | 88 | 90 | 90 | 90 |
| Remarks | Intact | Hydrated | Hydrated | Hydrated | Intact | Intact | Intact | Intact |

A remarkable improvement was seen in the hardness values of the shale wafers as TPGB was incorporated with ethylene glycol. A 65/35 blend reached the same effectiveness as HF 100N with a 90 shale hardness value and outperformed HF 100N in the ability to keep the shale from hydrating. While extremely good inhibition results were found with the 60/40 and 50/50 blends, hardness values seem to have leveled off close to their initial values of 94.

EXAMPLE 3

In the following Example, gas hydrate formation was simulated using a gas hydrate generator developed by Milpark Drilling Fluids (now Baker Hughes INTEQ). The gas hydrate generator consisted of a high-pressure (76,834 kPa [11,000-psi]) vessel, temperature and pressure capabilities, and an IBM PC for control of the system and data acquisition. To begin the gas hydrate test, mud was placed into the autoclave cell, the cell was capped and the vacuum was pulled on the cell for 15 minutes while stirring at 500 rpms to remove the air from the cell. After evacuation of the cell, the cell was pressurized with a natural gas.

A cooling bath was raised to cover the cell, and the cell was allowed to reach an equilibrium temperature, then cooled at a rate of 2.8° C. (5° F.) per hour until hydrate formation was detected. To detect hydrate formation, the computer monitored the temperature (cell and bath) and applied pressure. When the slope of the pressure verses temperature curve changed significantly, hydrates were starting to form (one volume of hydrates can contain 170 volumes of gas at standard conditions).

Once hydrates started forming, the bath temperature was held constant for about 10 hours to allow maximum hydrate formation before heating the bath to room temperature (0.83° C./hour [1.5° F./hour]). During heatup, the gas hydrates became less stable, resulting in the gas being released from the hydrate structure, and pressure increasing. When all of the gas was released, the pressure returned to the initial pressure recorded from the cool-down cycle. This was known the "dissociation point"—that is, no hydrates were present at this pressure and temperature.

The fluid containing 23% NaCl/10% by volume of a 65/35 EG/TPGB blend produced a hydrate suppression of 23.34° C. (42° F.) compared to fresh water. A 26% NaCl fluid had a hydrate suppression of 19.45° C. (35° F.) while having a density of 1.2 g/cm$^3$ (10 lb/gal); therefore, the EG/TPGB blend imparted greater gas hydrate suppression with an approximate 0.048 g/cm$^2$ (0.4 lb/gal) density advantage.

EXAMPLE 4

Several deep water drilling formulations were tested for rheological and shale stability data using the procedures described in Examples 1 and 2, respectively. As shown in the following table, the fluid containing the EG/TPGB blend gave superior shale stability as measured by shale hydration, hardness, and recovery after dynamic aging as compared to a standard formulation and a fluid containing another common gas hydrate shale inhibitor:

| Parameter | Base Fluid | 65/35 EG/TPGB | Product A |
|---|---|---|---|
| Formulation: | | | |
| Tapwater, bbl | 0.8 | 0.8 | 0.8 |
| MIL PAC LV, lb/kg (lb/bbl) | 0.373 (1) | 0.373 (1) | 0.373 (1) |
| 65/35 EG/TPGB, bbls | — | 0.30 | — |
| Product A, bbls | — | — | 0.30 |
| NaCl, % by wt | 23 | 23 | 23 |
| NEW-DRILL Plus, kg/bbl (lb/bbl) | 0.28 (0.75) | 0.28 (0.75) | 0.28 (0.75) |
| XAN-PLEX D, kg/bbl (lb/bbl) | 0.28 (0.75) | 0.28 (0.75) | 0.28 (0.75) |
| Properties: | | | |
| Density, g/cm$^3$ (ppg) | 1.15 (9.6) | 1.18 (9.85) | 1.2 (10.0) |
| Rheology @ ° C./° F. | 48.9/120 | 48.9/120 | 48.9/120 |
| Plastic Viscosity, cP | 16 | 13 | 15 |
| Yield Point, kg/100 m$^2$ (lb/100 ft$^2$) | 63.44 (13) | 73.2 (15) | 58.56 (12) |
| YZ Value | 1 | 1 | 1 |
| Initial Gel, kg/100 m$^2$ (lb/100 ft$^2$) | 9.76 (2) | 14.64 (3) | 14.64 (3) |
| 10 min. gel, kg/100 m$^2$ (lb/100 ft$^2$) | 14.64 (3) | 19.52 (4) | 19.52 (4) |
| API Fluid Loss, ml | 6.0 | 5.8 | 7.68 |
| Shale Inhibition: | | | |
| Hardness Value | 75 | 90 | 90 |
| Recovery, % | 74 | 98.5 | 86.3 |
| Hydration, % | 18 | 0.4 | 10.8 |

Persons of ordinary skill in the art will appreciate that many modifications may be made to the embodiments described herein without departing from the spirit of the present invention. Accordingly, the embodiments described herein are illustrative only and are not intended to limit the scope of the present invention.

We claim:

1. A fluid comprising water as a continuous phase and being selected from the group consisting of a drilling, a drill-in, and a completion fluid, said continuous phase comprising a gas hydrate suppressing amount of a blend comprising a first amount of ethylene glycol at a ratio to a second amount of tripropylene glycol bottoms wherein said ratio is effective to inhibit hydration of shale by said continuous phase.

2. A fluid comprising water as a continuous phase and being selected from the group consisting of a drilling, a drill-in, and a completion fluid said continuous phase comprising a gas hydrate suppressing amount of a blend comprising a first amount of ethylene glycol at a ratio to a second amount of tripropylene glycol bottoms, wherein said ratio is effective to inhibit hydration of shale by said continuous phase and said second amount comprises an amount effective to lower density of said fluid to a level effective to inhibit fracturing of a formation during deepwater drilling.

3. A fluid comprising water as a continuous phase and being selected from the group consisting of a drilling, a drill-in, and a completion fluid, said continuous phase comprising a gas hydrate suppressing amount of a blend comprising a first amount of ethylene glycol at a ratio to a second amount of tripropylene glycol bottoms, wherein said ratio is effective to inhibit hydration of shale by said continuous phase and said amount of said blend comprises at least about 10 vol % of said fluid.

4. A fluid comprising water as a continuous phase and being selected from the group consisting of a drilling, a drill-in, and a completion fluid, said continuous phase comprising a gas hydrate suppressing amount of a blend comprising a first amount of ethylene glycol at a ratio to a second amount of tripropylene glycol bottoms, wherein said ratio is effective to inhibit hydration of shale by said continuous phase, said amount of said blend comprises at least about 10 vol % of said fluid, and said second amount comprises at least about 20 vol % of said blend.

5. An additive for a fluid selected from the group consisting of a drilling, a drill-in, and a completion fluid, said additive comprising a blend comprising a first amount of ethylene glycol at a ratio to a second amount of tripropylene glycol bottoms, wherein said ratio is effective to inhibit hydration of shale by said fluid.

6. An additive for a fluid selected from the group consisting of a drilling, a drill-in, and a completion fluid, said additive comprising a blend comprising a first amount of ethylene glycol at a ratio to a second amount of tripropylene glycol bottoms, wherein said ratio is effective to inhibit hydration of shale by said fluid and said second amount is effective to lower density of said fluid to a level effective to inhibit fracturing of a formation during deepwater drilling of said formation.

7. An additive for a fluid selected from the group consisting of a drilling, a drill-in, and a completion fluid, said additive comprising a blend comprising a first amount of ethylene glycol at a ratio to a second amount of tripropylene glycol bottoms, wherein said second amount comprises about 20 vol % or more of said blend.

\* \* \* \* \*